H. O. REESE.
COMBINED HEATER AND COOKING UTENSIL.
APPLICATION FILED DEC. 3, 1915.
1,190,584.
Patented July 11, 1916.
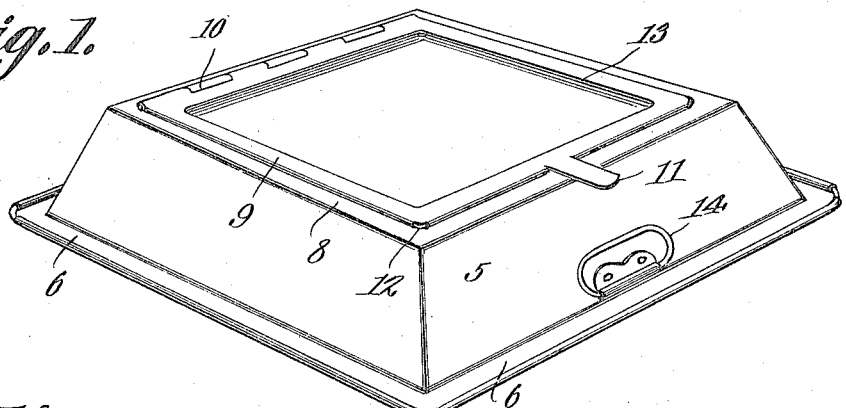
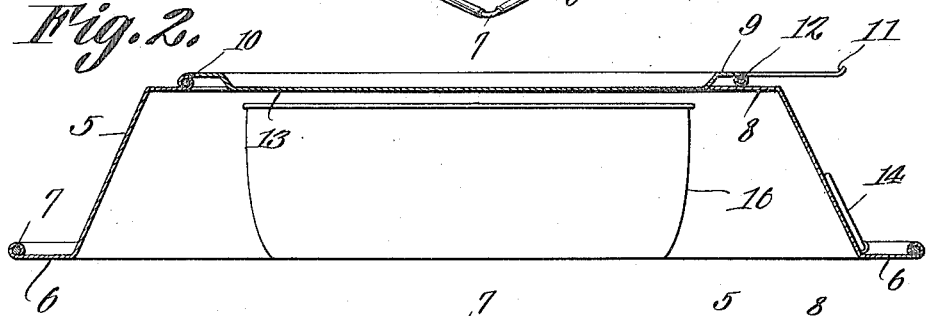
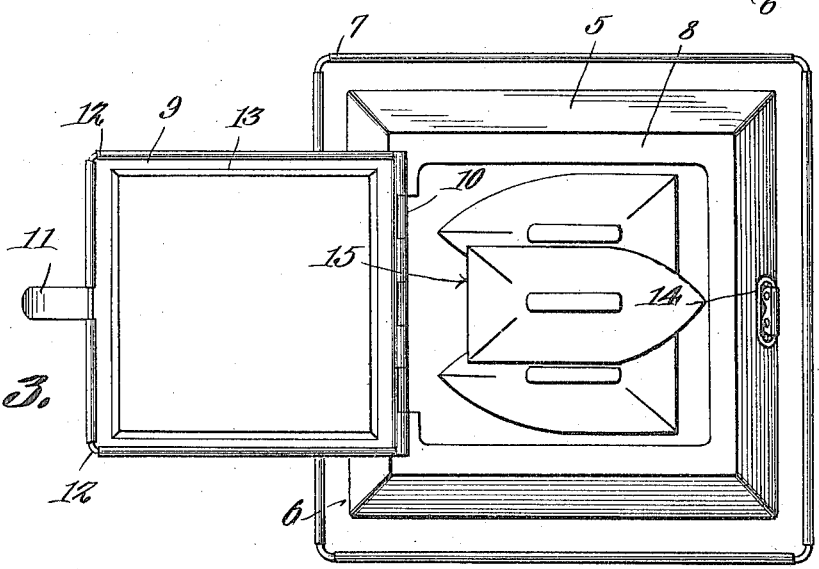
Inventor
Henry O. Reese,
By Henry J. Pewington,
Attorney

UNITED STATES PATENT OFFICE.

HENRY O. REESE, OF ATLANTIC CITY, NEW JERSEY.

COMBINED HEATER AND COOKING UTENSIL.

1,190,584.  Specification of Letters Patent.  Patented July 11, 1916.

Application filed December 3, 1915. Serial No. 64,834.

*To all whom it may concern:*

Be it known that I, HENRY O. REESE, a citizen of the United States, residing at Atlantic City, in the county of Atlantic and State of New Jersey, have invented certain new and useful Improvements in Combined Heaters and Cooking Utensils, of which the following is a specification.

This invention relates to improvements in combined heating and cooking utensils characterized by a hood which forms a heating chamber, and is provided at the top with a hinged lid constructed and arranged to serve as a cooking utensil.

The invention has for its object to provide a handy, cheap and useful device of the kind stated, and to this end, the invention consists in a novel combination and arrangement of parts to be hereinafter described and claimed.

In order that the invention may be better understood, reference is had to the accompanying drawing, in which—

Figure 1 is a perspective view of the device; Fig. 2 is a cross-section thereof, and a cooking utensil therein, and Fig. 3 is a plan view of the device with the lid thereof swung open.

Referring specifically to the drawing, the body of the device or appliance is in the form of a hood having a flat open bottom and outwardly sloping side walls 5. At the bottom of the side walls are outstanding horizontal flanges 6, the edges of which may be curled over and provided with a wire reinforcement 7. These base flanges serve to support the hood in upright position when in use. The side walls 5 have inturned horizontal flanges 8 at the top, forming the top of the hood, said top having an opening which is provided with a closure in the form of a hinged lid 9, the latter being dimensioned to cover the top opening. The lid 9 is hinged to one of the flanges 8, as indicated at 10, and has at its free end a handle 11. The edges of the lid may also be curled over and provided with a wire reinforcement 12. In the center of the lid 9 is a depression 13 of suitable depth, which gives the lid the form of a pan.

The shape of the hood as shown is that of a truncated quadrangular pyramid, but the invention is not limited to this shape and various changes in this respect may be made. The size of the device may also be varied. The preferred embodiment of the invention has been illustrated and described, but it will be apparent that many modifications in the structural details may be made without a departure from the spirit and scope of the invention as claimed hereinafter. To facilitate the handling of the device, the hood is provided with a suitable handle 14 at one end.

The device is designed more particularly for use in connection with gas stoves, and in use it is placed over the burner of the stove to inclose the cooking vessel seating over the burner. Upon closing the lid 9, the vessel in the hood is entirely inclosed, and the top of the hood and the lid deflect the heat down and around the vessel, causing the heat to be more uniform, and the cooking more rapid, and also effecting a saving of gas. The hood also acts as a guard to prevent air drafts from blowing the gas flame. The hood is also designed for heating sad irons and cooking utensils as indicated at 15 and 16. The lid 9 may be used as a griddle, and also as a pan for frying eggs and other articles of food. The depression 13 holds any grease or other substances, and prevents the same from running over the top of the hood and down the sides thereof onto the stove. When the device is used as a sad iron heater, the lid will usually be left open to prevent the handles of the irons from getting too hot.

The device is not limited for use in connection with gas stoves, but may, with equal facility, be used on other kinds of stoves. The material out of which the device is made may be of sheet metal, cast iron, or the like.

Where the cooking vessel has a greater depth than that of the hood, the lid of the latter may be left open, and with the lid in this position, the hood will also accommodate a cooking vessel having a handle. In either case, the hood will concentrate the heat around the side of the vessel.

The depression 13 in the lid 9 is dimensioned to seat in the top opening of the hood when the lid is closed, that portion of the lid which surrounds the depression seating on the flanges 8, whereby a tight closure is effected.

I am aware that changes and alterations may be resorted to in the form and arrangement of the several parts herein described without departing from the spirit and scope of my invention as defined in the appended claim, hence I do not wish to limit my invention to the exact construction herein set forth; but, Having fully described my invention, what I claim and desire to secure by Letters Patent, is:

A combined heating and cooking utensil, comprising a hood formed to inclose a cooking utensil and, having sloping sides and open at the bottom, the top of the sides having inturned flanges, and a lid closing the top of the hood, said lid seating on the top flanges and having a depression to serve as a pan seating inside the top flanges.

In testimony whereof I affix my signature in presence of two witnesses.

HENRY O. REESE.

Witnesses:
A. W. IRVING,
LIZZIE IRVING.

Copies of this patent may be obtained for five cents each, by addressing the "Commissioner of Patents, Washington, D. C."